Oct. 4, 1955 G. L. KITSON 2,719,509
POULTRY WATERER
Filed May 15, 1953 2 Sheets-Sheet 1
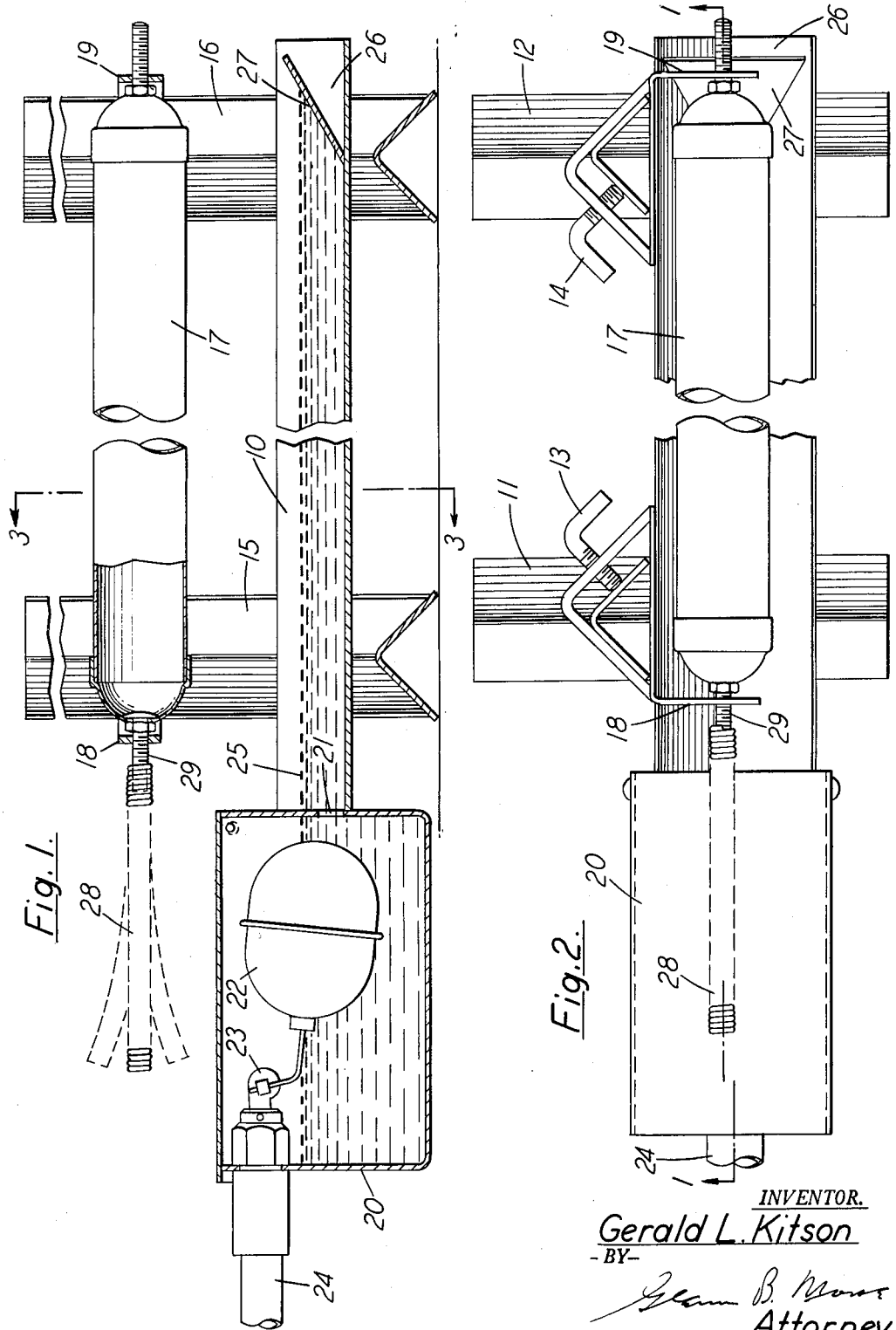
INVENTOR.
Gerald L. Kitson
BY
Attorney Oct. 4, 1955   G. L. KITSON   2,719,509
POULTRY WATERER
Filed May 15, 1953   2 Sheets-Sheet 2
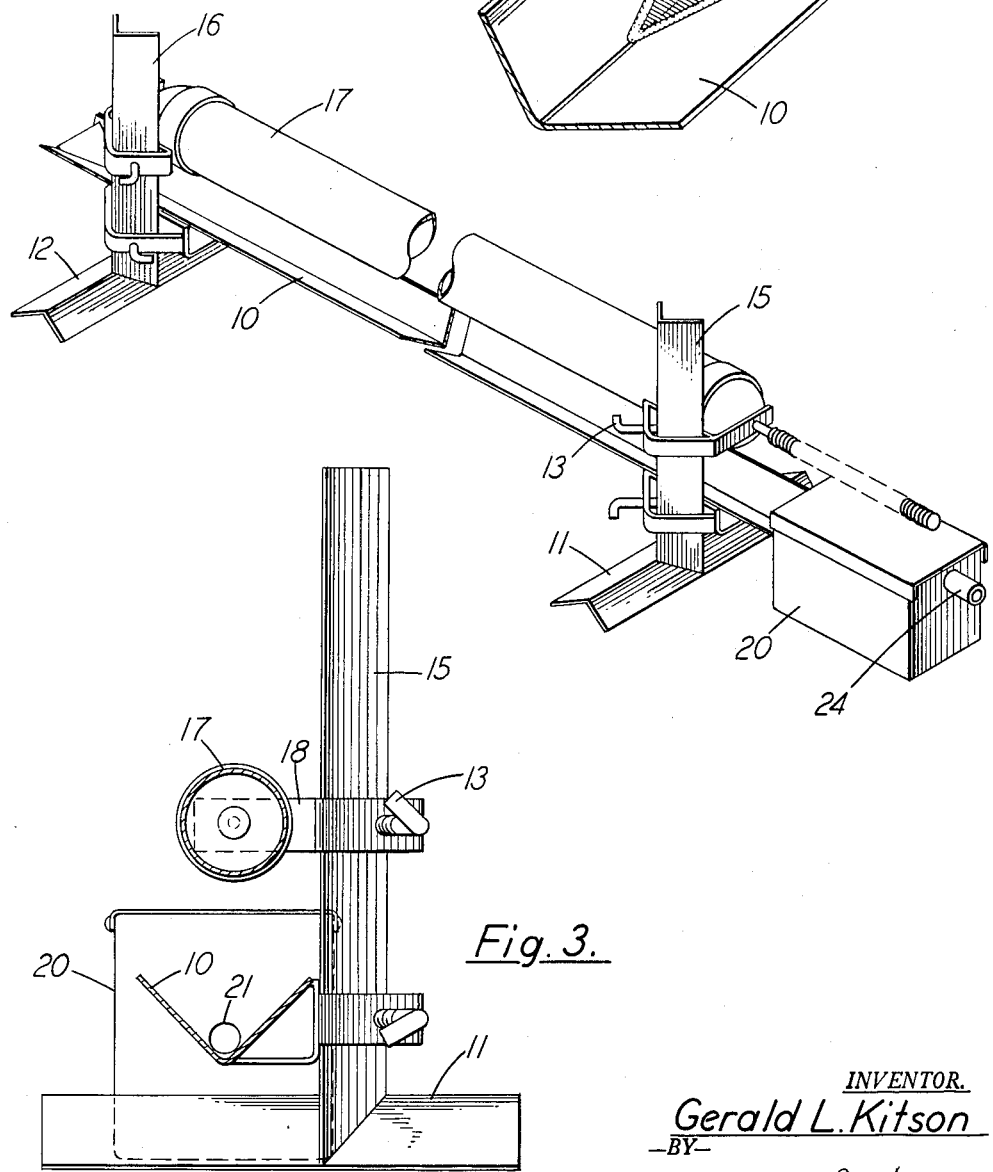
INVENTOR.
Gerald L. Kitson
BY
Attorney

United States Patent Office 2,719,509
Patented Oct. 4, 1955

2,719,509
POULTRY WATERER
Gerald L. Kitson, Rockford, Mich.
Application May 15, 1953, Serial No. 355,293
1 Claim. (Cl. 119—74)

The preferred form of the present invention provides a device intended primarily to dispense drinking water to poultry. The ideal means for accomplishing this function involves an elongated shallow trough to which water is supplied at a constant level. This trough can be supported at the desired distance above the ground by adjustable leg means, the adjusted height of which will ordinarily reflect the size of the birds that will use the unit. This general type of device has shown a tendency to accumulate foreign material in the trough, resulting in the necessity of periodically cleaning it. The present invention provides a trough design which facilitates the cleaning operation, and makes it possible to clear the trough with a continuous motion of a scraper or broom. The end of the trough is provided with a closure (to retain the water to a desired level), and this closure member is slanted in such a fashion that the continuous movement of the broom or scraper will urge the accumulated foreign material upwardly as along a ramp. Conventional design for water troughs involves an end-closure member disposed in a plane generally perpendicular to the axis of the trough, requiring a considerable amount of extra labor to clear out the foreign material which has been moved down toward the end by the cleaning operation.

The present invention also provides for a float-controlled water level in which the float has adequate depth for its actuation without involving an excessive depth in the trough. This is accomplished by the provision of a float chamber which communicates with the trough in such a manner that the water level established by the float-operated valve system creates a depth in the trough substantially less than that in the float chamber. Very little depth is actually required in the trough, and an excess of depth merely leads to splashing and loss of water to the ground. It has also been discovered that a water depth maintained in the trough at about one-half inch will result in keeping the trough substantially clear of obstruction. This is due to the fact that such obstruction is principally caused by feed dropping from the birds' bills and accumulating in the trough. With the shallow depth this feed is again removed by the birds.

The present invention also provides a perching inhibitor tending to prevent the birds from sitting on the device, and the preferred form of this feature involves a cantilever-mounted length of coiled spring, with the point of suspension horizontally removed from the object being protected. The failure of the spring to give solid support to a bird attempting to light on it will frighten the bird so that it will move on to some other location.

The several features of the present invention will be discussed in detail through an analysis of the particular embodiments illustrated in the accompanying drawings. In the drawings, Figure 1 shows a sectional elevation of a device embodying the present invention, with a portion of the same broken away to conserve space.

Figure 2 is taken in projection with respect to Figure 1, and illustrates the same mechanism.

Figure 3 presents a section taken on the plane 3—3 of Figure 1.

Figure 4 shows a perspective view of the device illustrated in Figures 1 to 3.

Figure 5 is a perspective view of a broken-away portion of the end of the trough, taken on an enlarged scale.

Referring to the drawings, a watering trough 10 is shown supported upon the adjustable-height leg assembly units 11 and 12, the height of which can be adapted to the particular size of the birds having access to the trough through the manipulation of the locking bolts 13 and 14. The leg assemblies 11 and 12 have a vertical column member indicated at 15 and 16, respectively, and a conventional perching-inhibiting roller 17 is rotatably mounted between the columns 15 and 16 in the brackets 18 and 19.

A float chamber 20 communicates with the trough 10 at the opening 21. A float 22 is disposed within the chamber 20, and positions a valve unit 23 which controls the flow through the inlet conduit 24. The level of the water in the chamber is generally indicated at 25, the level being maintained in the trough 10 due to the communication through the opening 21. It will be noted that the relative position of the trough 10 and the bottom of the chamber 20 provides for a desirable shallow depth in the trough while still permitting adequate depth in the chamber 20 to actuate the float member 22 without requiring large and inconvenient dimensions thereof.

The outer end 26 of the trough 10 is closed to maintain the water 25 by an inclined closure member 27. This member is slanted with respect to the trough so that the length of the trough adjacent the upper end of the closure member exceeds the length of the trough at the juncture of the closure member with the bottom. The purpose of this arrangement is to permit a continuous sweeping action to clear foreign material from the trough as the broom or scraper is moved toward the closure member and past it.

To inhibit perching above the float chamber 20, the length of coiled spring 28 is mounted, preferably, with its point of support horizontally displaced from the area above the float chamber. The simplest form for the mounting of this unit has been found to be the threaded engagement of the helical spring with the threaded projecting end of the shaft 29 (with which the perching inhibiting roller 17 is supported in the bracket 18). The freedom of the roller 17 to turn is not only useful in the prevention of perching, but also facilitates threading the spring 28 on the shaft 29.

The particular embodiments of the present invention which have been illustrated and discussed herein are for illustrative purposes only, and are not to be considered as a limitation upon the scope of the appended claim. In this claim, it is my intent to claim the entire invention disclosed herein, except as I am limited by the prior art.

I claim:

In a water dispensing device, transversely unobstructed trough means having end-closure means including a plate extending between the sides of said trough means and secured thereto, and disposed at an upward inclination to the axis of said trough means and oriented so that the top of said trough means extends axially beyond the bottom thereof at said end-closure means, said trough means extending beyond said plate to reinforce and protect the same.

References Cited in the file of this patent
UNITED STATES PATENTS

| | | |
|---|---|---|
| 225,309 | Vincent | Mar. 9, 1880 |
| 910,800 | Edmiston | Jan. 26, 1909 |
| 1,094,755 | Smith | Apr. 28, 1914 |
| 1,182,823 | Weaver | May 9, 1916 |
| 1,349,841 | Luedke | Aug. 17, 1920 |
| 1,749,808 | Greene | Mar. 11, 1930 |
| 1,816,684 | Liechty | July 28, 1931 |
| 1,828,048 | Jevons | Oct. 20, 1931 |
| 1,917,371 | Hill | July 11, 1933 |
| 2,011,684 | Martin | Aug. 20, 1935 |
| 2,502,720 | Haley | Apr. 4, 1950 |
| 2,584,782 | Beckman | Feb. 5, 1952 |

FOREIGN PATENTS

| | | |
|---|---|---|
| 21,891 of 1929 | Australia | Aug. 15, 1930 |